United States Patent [19]

Heffernan et al.

[11] 4,299,185
[45] Nov. 10, 1981

[54] DEVICE FOR WARNING OF IMPENDING ROOF-FALL IN UNDERGROUND EXCAVATIONS

[75] Inventors: William R. Heffernan, Westfield, N.J.; Mary-Louise Vega, New Hope; Joel A. Gingras, Sr., Doylestown, both of Pa.

[73] Assignee: American Cyanamid Company, Stamford, Conn.

[21] Appl. No.: 96,358

[22] Filed: Nov. 21, 1979

[51] Int. Cl.³ .............................................. G01L 1/24
[52] U.S. Cl. .......................... 116/202; 116/DIG. 34; 116/212
[58] Field of Search ............... 116/212, 202, DIG. 34; 73/784, 761; 33/1 H, 125 B; 85/62, 5 P

[56] References Cited

U.S. PATENT DOCUMENTS 3,764,796 10/1973 Gilliam ................................ 116/202
3,844,248 10/1974 Parker ................................. 116/202
3,987,668 10/1976 Popenoe ............................. 73/761

OTHER PUBLICATIONS

Engineering/Mining Journal, Aug. 1978, pp. 72 and 73, by Jack Parker.

Primary Examiner—Gerald Goldberg
Assistant Examiner—Denis E. Corr
Attorney, Agent, or Firm—Gordon L. Hart

[57] ABSTRACT

Apparatus for activation of a chemical lightstick by downward sag of a mine roof is described. Through a spool and collar at the mine roof, two wires are extended from an anchor set in a stable formation above the roof, and are tied to a lightstick below the collar and spool. Pathways for passage of the two wires through the spool are provided so the wires are outside a center opening in the spool but are inside the outermost diameter of the neck of the spool. A spring-loaded embodiment permits the apparatus to tolerate a measured sag without activating the lightstick.

6 Claims, 8 Drawing Figures

DEVICE FOR WARNING OF IMPENDING ROOF-FALL IN UNDERGROUND EXCAVATIONS

The invention relates to improved roof-fall warning devices for use in mines or other subterranean caverns.

In the Engineering/Mining Journal, August 1978 at pages 72, 73, Jack Parker described warning devices which employ a chemiluminescent lightstick to indicate roof sag. A bore hole is drilled upward from the mine roof through the overlying earth formations. Inside the hole, at a stable formation above the roof, an anchor is set firmly. Any suitable anchor may be used, such as opposed wedges, a spring-set anchor, or the like. Two steel wires are fixed to the anchor and extend downward through the bore to the mine roof. In a primitive roof sag indicator that was first described by U.S. Pat. No. 3,844,248 patented Oct. 29, 1974, to Jack Parker, the two ends of these wires are strung downward out of the bore hole on opposite sides of a chemiluminescent lightstick which is held horizontally against the mine roof at the open end of the bore hole by the two wires which straddle the lightstick and are fastened together underneath the lightstick, at about the center of the length of the lightstick. To tighten the lightstick against the roof, it can be turned on a vertical axis of rotation to twist the two wires in the bore hole, causing the wires to shorten and pull the lightstick up tight against the mine roof.

The chemiluminescent lightstick comprises a sealed outer flexible plastic tube which contains separated components of a liquid chemilumnescent mixture in compartments inside the outer tube. In a preferred lightstick for use with the present invention, the two components of the mixture are respectively sealed inside two separate glass vials which are both sealed inside the outer tube.

When the outer flexible tube is bent or squeezed, the inner glass vials will be crushed, causing the separate components to mix within the outer tube. This mixture emits chemiluminescence, i.e. chemical light, which is clearly and noticeably visible.

In the primitive warning device described above, any downward shift of the mine roof would press the lightstick downward against the wire thus squeezing or bending the outer tube to crush the inner vials and activate the chemical light. A slight downward shift can thus cause a visible light signal to warn of an impending roof fall in time to take the necessary precautions.

The Engineering/Mining Journal article also described some early improvements over the primitive device described in the patent. At the opening to the bore hole in the mine roof, a collar is provided as a bearing surface. This collar is a simple flat ring, open at the center for access to the bore hole. The collar diameter is greater than that of the bore hole and the collar is held against the roof surrounding the bore hole by upward force from the flange of a spool member. The spool comprises a neck and a flange attached at one end of the neck. The neck is of a width that will fit through the the center of the collar so the neck can extend upward into the bore hole. In this position, the flange of the spool bears against the collar. There is an axial opening through the center of the spool for access to the bore hole when the collar and spool are fitted in place as described. The two wires extending downwamd from the anchor are strung through the center opening in the spool and are tied around the center of the length of a lightstick to hold it horizontally up against the flange of the spool, which in turn presses the collar firmly up against the mine roof.

In a further improvement also shown by Jack Parker, a sheet metal strap is doubled over, with the lightstick inside its bight beneath the flange. The ends of the strap extend upward through the center opening of the spool. The wires are tied to the ends of the strap. By turning the lightstick, the wires are twisted together to pull the strap upward and tighten the lightstick against the spool flange. Any roof sag will push downward, on the collar, pressing the flange against the lightstick. The strap is held by the wires which do not shift when the roof sags and the relative downward movement of the flange presses the lightstick against the strap, causing the glass vials inside to break.

In a preferred lightstick for this use, the separate components of the chemiluminescent mixture are contained in two glass vials each occupying half the length of the tubular chamber inside the sealed flexible tube. Each inner vial thus has one of its ends at the center of the length of the outer tube. When a strap is placed under the center of the length of the outer flexible tube, its width extends under the ends of both glass vials inside the tube.

When a strap is used, the opening through the center of the spool preferably has the cross sectional shape of a square whose sides are just barely wider than the width of the strap. The two strap lengths which extend into the spool from below are spaced apart inside the spool by the width of the lightstick held in the bight of the strap just below the spool. The strap lengths through the spool are restrained, by the rectangular inner walls of the spool, from turning inside the spool. The strap and the spool thus will turn together with the lightstick when the lightstick is rotated to tighten the wires.

Instead of attaching the wires to the two upper ends of the strap inside the bore hole, it was found more practical to string the two wires downward through the spool straddling the two lengths of the strap and tied together underneath the bight of the strap. This simplifies the installation of the device. In early embodiments, the wires were strung through the spool in the same axial opening that contained the strap lengths, but when the wires were twisted by turning the lightstick, the twisting wire would tangle with the strap lengths inside the spool, causing the strap to be deformed.

We have made the device more stable by stringing the two wires downward through the spool along paths that are outside the axial opening which contains the strap. This can be described in more detail by reference to the drawings.

Figure 3:
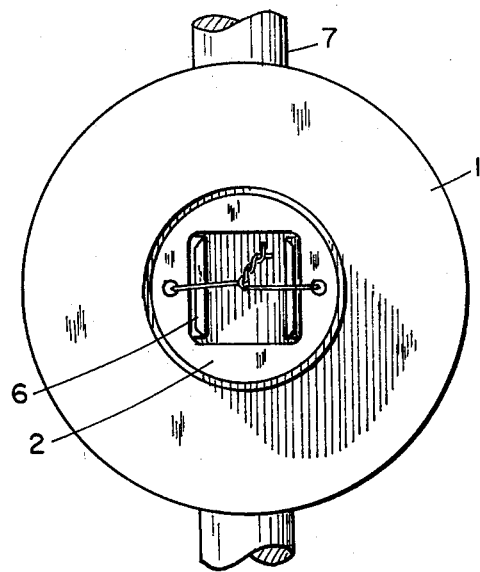
FIG. 3 is a top view of the assembly shown in FIG. 1.
Figure 2:
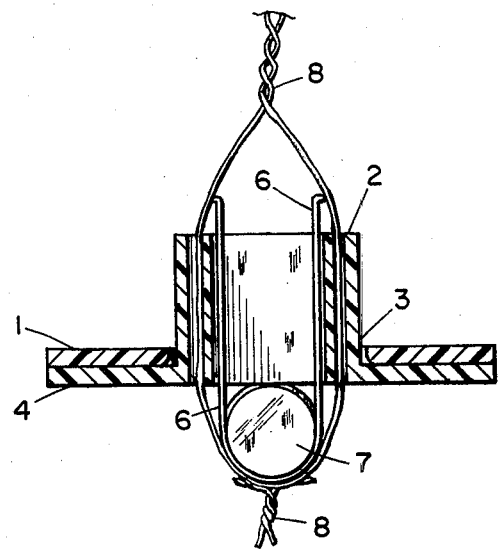
FIG. 2 is a cross-section side view of the assembly in FIG. 1, along the plane of the spool axis.
Figure 1:
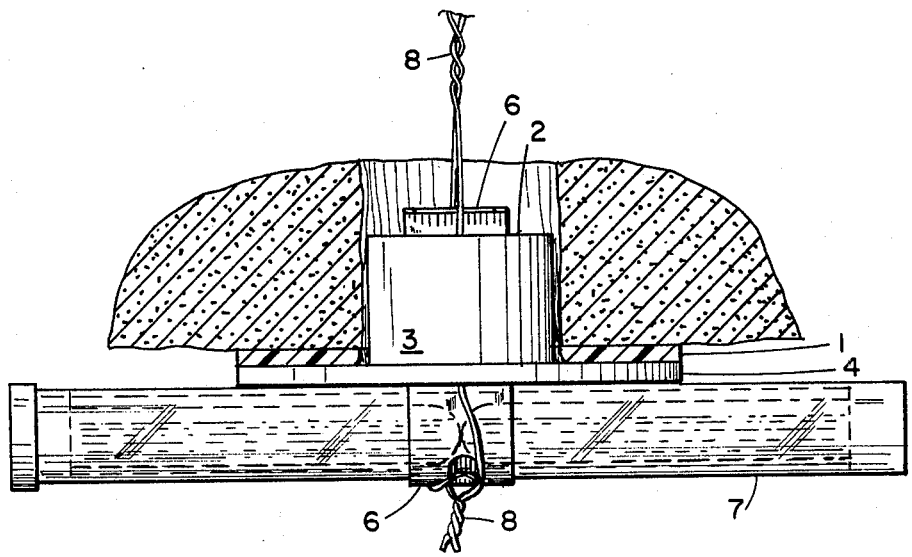
FIG. 1 is a side view of one embodiment with its several elements shown assembled in place for use as a roof-fall warning device.

Referring now to FIG. 1, the device comprises collar (1) which is a flat circular ring of rigid thermoplastic material about one-eighth inch thick. The outside diameter of the ring is three inches and the inside diameter is 1-5/16 inch. When the collar is placed concentrically over the opening to the bore hole at the mine roof, it provides access to the bore hole through the center of the ring. The inner face of the collar bears against the mine roof around the opening to the bore hole and its outer face provides a flat bearing surface. A spool (2) made of rigid thermoplastic comprises a cylindrical neck (3) and a concentric circular flange (4) at one end of the neck. The neck is 1¼ inches in outside diameter and extends in length ⅞ inch above the inner face of the flange. The flange (3) is ⅛ inch thick and 3 inches in outside diameter. Referring now to FIGS. 2 and 3, an opening extends through the neck and flange of the spool, centered on the axis of the cylinder. This opening has a ¾ inch square cross-section. Thus, the inner surface of the spool is defined by four right rectangular surfaces while the outer surface of the neck is a cylinder surface. Through the solid portion of the neck, between its inner surface and the outer cylindrical surface two small holes are drilled parallel to the spool axis along the length of the spool. These two holes are located in the solid portion of the neck just outward from the centers of the two opposite sides of the square inner cross-section. Each of these holes is about 1/16 inch in diameter. These two holes provide paths through the spool for leading the two wires (8) downward along the length of the spool away from the center opening but sufficiently inward from the outer diameter of the neck to be held free from between the neck and the collar or bore hole.

A metal strap (6) is doubled with its bight under the spool and its ends extended upward through the center of the spool. The strap lengths extending into the spool are held apart by the cylindrical outer shell of a lightstick (7) which is held inside the bight of the strap, just beneath the spool. The width of the strap is 11/16 inch, just enough narrower than one side of the square so that the two strap lengths can lie flat against opposite rectangular walls inside the spool. The ends of the strap are most conveniently cut off just above the neck and small shoulders are bent to extend outward about ⅛ inch to provide tabs for engaging the end of the neck.

With the strap extended through the spool as described, the ends of the two wires extending downward from the anchor above are led through the two holes in the wall of the spool and tied together underneath the bight of the the strap. Before the wire ends are secured, the neck of the spool has been inserted through the collar, into the bore hole bringing the flange of the spool snugly up against the outer flat surface of the collar which in turn bears snugly against the mine roof. This is illustrated in FIG. 1.

To tighten the assembly, the lightstick is rotated, turning the wires to twist and shorten the two wires along their length in the bore hole. As the wires are shortened by twisting, the bight of the strap is pulled upward, forcing the lightstick against the spool, and in turn forcing the spool and ring tight up against the mine roof. One must be careful not to tightn the wires enough to crush the lightstick.

A downward sag of the mine roof will force the flange downward against the lightstick, crushing the lightstick against the bight of the strap. Thus, the roof sag will activate the chemical light.

Figure 4:
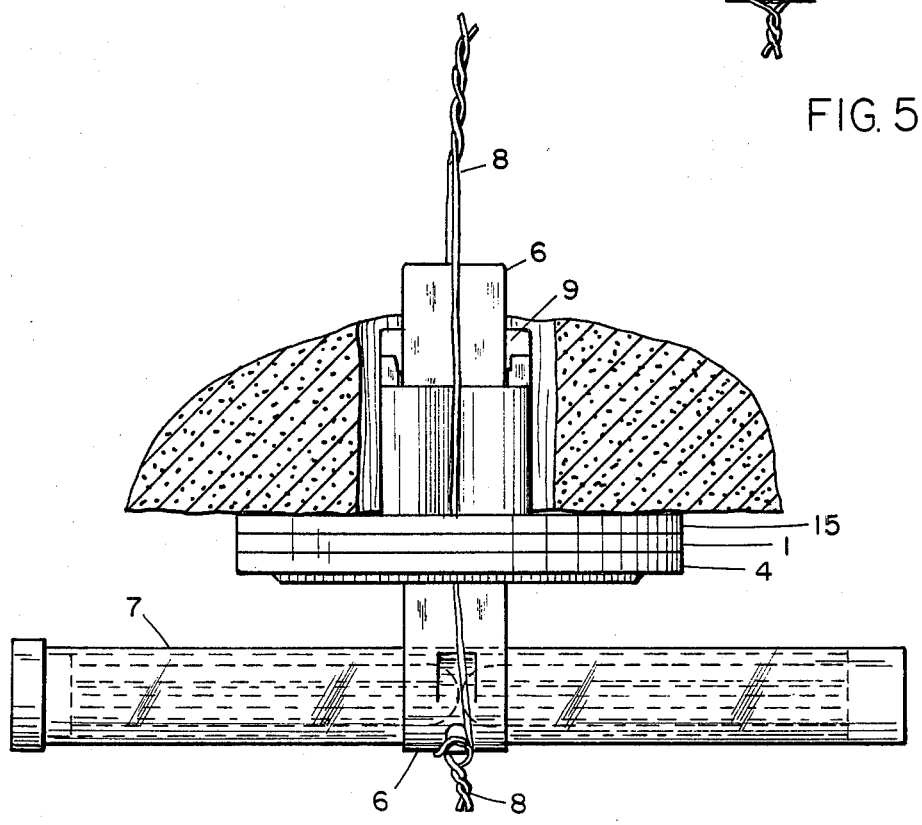
FIG. 4 is a side view of another embodiment with its elements shown assembled in place for use as a warning device.

Referring now to FIG. 4, another device embodying the invention is shown, with additional features. This device has all of the essential features of the device in FIG. 1, but has some further variations and additions which will be explained in more detail.

Figure 6:
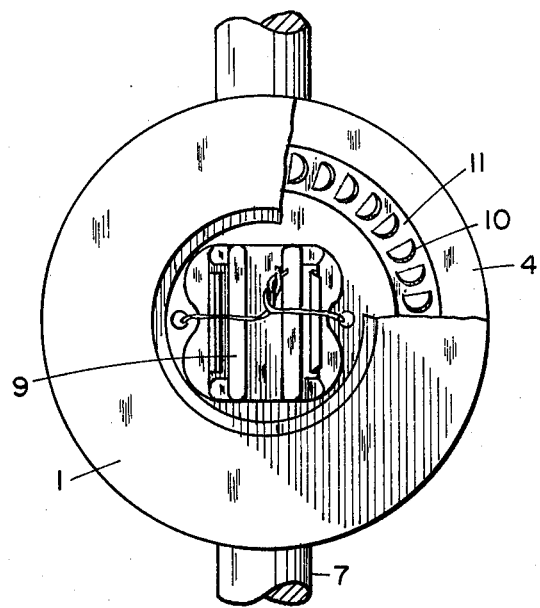
FIG. 6 is a top view of the apparatus in FIG. 4.
Figure 5:
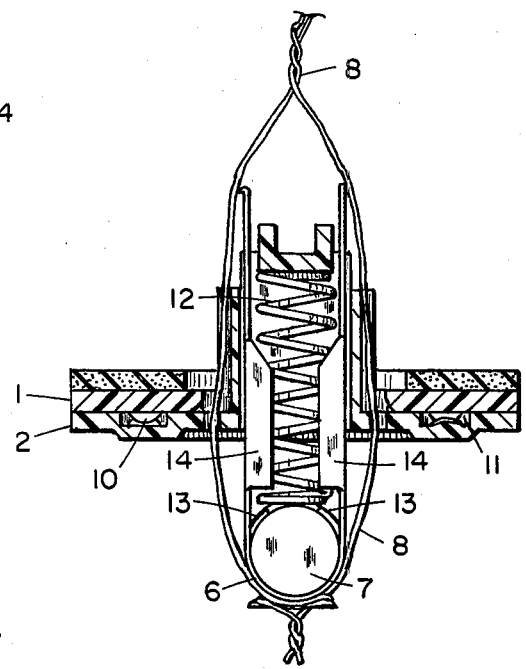
FIG. 5 is a cross-section side view of the apparatus in FIG. 4, along the plane of the spool axis.
Figure 7:
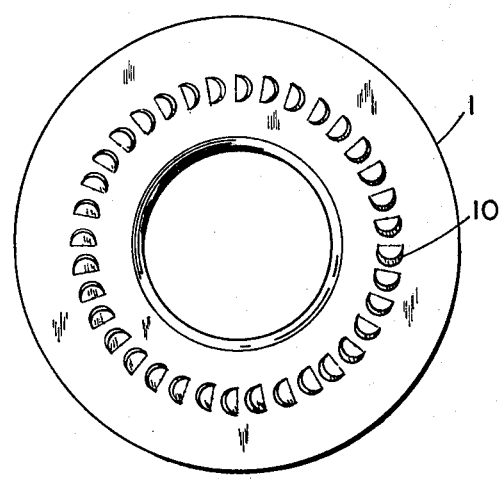
FIG. 7 is a bottom view detail of the collar in the apparatus of FIG. 4.
Figure 8:
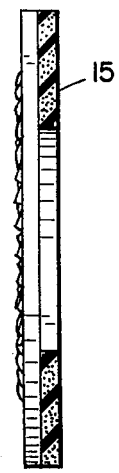
FIG. 8 is a side view of FIG. 7.

The ring (1) has essentially the same dimensions as that described in FIG. 1. It is modified by the addition of a thin cushion (15) of elastomeric material, such as a ring of sponge rubber cut from a ⅛ inch thick sheet of such material and cemented to the flat surface of the collar facing the mine roof. This cushion provides a resilient surface ffor better contact between the ring and the rough surface of the mine roof. This cushion can prevent the ring from slipping on the roof surface. Details of the collar are shown in FIGS. 7 and 8. Referring now to FIGS. 5 and 6 on the outer face of the ring there is provided a concentric circle of ratchet teeth (10) which will mesh with a corresponding circle of ratchet teeth (10) at the inner face of the spool flange. The opposed sets of ratchet teeth are shaped to slip one over the other permitting clockwise rotation of the spool but to mesh checking counter-clockwise rotation of the spool. This prevents the tightened wires from coming untwisted. In the embodiments shown, the ratchet teeth on the ring stand out above the flat face of the collar. The corresponding set of ratchet teeth on the spool flange are set on the bottom of a circular groove (11), below the flange face. The depth of the groove is selected to allow the opposed sets of ratchet teeth to intermesh operably within the groove when the opposed faces of the flange and ring are brought into contact.

Instead of drilling two holes through the neck of the spool, two longitudinal grooves are indented in the opposite sides of the neck along its outer wall. At the flange, two holes are drilled through its thickness, one of such holes at the foot of each of the neck grooves. As shown in FIGS. 5 and 6, the two wires from the anchor above are led downward outside the neck along the grooves provided, thence through the two holes in the flange. Below the flange, the two wires are strung along the outside of the strap and tied together underneath the bight of the strap, as shown in FIGS. 4 and 5.

Through the center of the spool, an axial opening extends longitudinally. This opening has square cross-section, and is defined by four flat rectangular walls. The two strap lengths extend from the bight below the spool upward through this center opening in the spool. At the upper end of the spool a rigid bridge (9) extends across the spool opening and is fastened at both of its ends to the spool. This bridge is placed across the opening to serve as a spacer between the two strap lengths when their upper ends extend above the end of the spool as shown in FIGS. 4-6. It further serves as a base at the end of the axial opening of the spool, to retain one end of a helical spring inside the spool. This helical spring is placed inside the spool between the two strap lengths. At the upper end of the spool the spring bears against the bridge. This spring extends downward through the spool and bears against the lightstick in the bight of the strap at the foot of the spool. When relaxed, the spring is longer than the length of the spool. When the device of FIG. 3 is assembled and the wires are twisted by turning the lightstick, the strap pulls the lightstick upward against the spring, causing the spring to compress inside the spool. The compressed spring at its lower end presses the lightstick down tight against the bight of the strap, but does not press hard enough to break the ampuoles inside the lightstick. The compressed spring presses upward against the bridge of the spool, forcing the spool upward until its flange engages the collar and the collar is against the mine roof. When this spring arrangement is used, the lightstick can be held securely in the device and the spool can be held in place without having to draw the lightstick up against the spool flange. For example a gap can be left between the lightstick and the bottom of the flange as shown in FIG. 5. This allows the device to tolerate a slight roof sag, e.g ⅛ inch, without activating the light, but any further shift of the roof downward would crush the lightstick between the strap and the flange.

In further variations of the spring-loaded device, the strap is fitted with right angle extensions (14) from the strap edges to retain the spring between the strap lengths inside the spool. Also, tabs (13) may be cut in the strap lengths and turned inward to help retain the lightstick in the bight of the strap. These tabs also help retain the spring between the two strap lengths.

It is preferable that the neck of the collar should be of a diameter to fit into the bore hole with only a narrow clearance between the walls of the bore hole and the collar. This close fit stabilizes the spool concentrically. By leading the wires from above downward through a pathway provided along the collar, as through holes in the neck (FIG. 1) or through channels along the outside of the neck (FIG. 2), the wires can avoid binding in the narrow clearance between the neck and the bore hole walls. Binding of the wires in the clearance between the neck of the spool and the collar is also avoided. At the bottom of the spool, this pathway will restrain lateral movement of the wires where they emerge below the spool, thus centering each wire alongside one of the strap lengths emerging from the center of the spool. At the bottom of the bight of the strap, a couple of small tabs, punched out from the sheet metal on the center line of the strap, may be provided to engage the two wires at the center of the strap where the two wire ends are tied together. Thus, the two wires are held centered on that part of the strap which hangs below the spool.

We claim:

1. A roof-fall warning device comprising: a collar with an inner face for bearing against the mine roof, an outer surface for bearing against a spool flange and a circular center opening through said collar; a spool having a neck and flange, and a center opening extending therethrough coaxial with said neck and flange, the neck of said spool being of a width to fit through the circular center opening of said collar with the inner face of said flange bearing against the outer face of said collar; the center opening in said spool being of square cross-section with flat rectangular sides; a strap of width narrower than the width of the square cross-section of said opening and of length sufficient to provide a bight in said strap extending outward from the flange end of said spool to receive a lightstick in said bight with the ends of said strap extended into the center opening of said spool; said spool defining paths for two wires to extend along the length of said spool outwardly from said center opening on opposite sides of its square cross-section and inwardly from the widest diameter of said neck; opposed sets of ratchet teeth at the respective faces of the collar and flange, said teeth shaped to slip for rotation of the spool in one direction and to check rotation of same in the opposite direction.

2. A roof-fall warning device comprising; a collar with an inner face for bearing against the mine roof, an outer surface for bearing against a spool flange and a circular center opening through said collar; a spool having a neck and flange, and a center opening extending therethrough coaxial with said neck and flange, the neck of said spool being of a width to fit through the circular center opening of said collar with the inner face of said flange bearing against the outer face of said collar; the center opening in said spool being of square cross-section with flat rectangular sides; a strap of width narrower than the width of the square cross-section of said opening and of length sufficient to provide a bight in said strap extending outward from the flange end of said spool to receive a lightstick in said bight with the ends of said strap extended into the center opening of said spool; said spool defining paths for two wires to extend along the length of said spool outwardly from said center opening on opposite sides of its square cross-section and inwardly from the widest diameter of said neck; a bridge attached to the neck and extended across the center opening at the end of the spool opposite the flange, a spring inside said spool bearing against said bridge at one of its ends and extending out of said spool at the flange end when the spring is relaxed, and compressible along the axis of said spool to fit inside said spool when compressed.

3. A device defined by claim 2 further comprising opposed sets of ratchet teeth at the respective faces of the collar and flange, said teeth shaped to slip for rotation of the spool in one direction and to check rotation of same in the opposite direction.

4. A device defined by claim 2 wherein said spring is a helical spring fitted lengthwise in the center opening in said spool and between the two lengths of said strap inside said opening.

5. A device defined by claim 4 wherein the two lengths of the strap inside said spool are fitted with right angle extensions along the strap edges to retain said spring between said strap lengths.

6. A device defined by claim 4 wherein said strap has tabs punched inward from each of the two lengths of said strap at points on said lengths to retain the end of said spring between said two strap lengths.

* * * * *